(12) United States Patent
Sukumari et al.

(10) Patent No.: US 12,480,839 B2
(45) Date of Patent: Nov. 25, 2025

(54) KÖHLER ILLUMINATION SYSTEM FOR INSPECTION OF RADIUSED END CONNECTORS

(71) Applicant: VIAVI SOLUTIONS INC., Chandler, AZ (US)

(72) Inventors: Abhilash Sukumari, Nepean (CA); Kevin Cassady, Monroe, WA (US); Christopher Russell Wagner, Kanata (CA); Nicklos Joseph Bulitka, Stittsville (CA); Eugene Chan, Ottawa (CA); Christian Richard Comtois-Arnaldo, Ottawa (CA)

(73) Assignee: VIAVI SOLUTIONS INC., Chandler, AZ (US)

(*) Notice: Subject to any disclaimer, the term of this patent is extended or adjusted under 35 U.S.C. 154(b) by 120 days.

(21) Appl. No.: 18/403,040

(22) Filed: Jan. 3, 2024

(65) Prior Publication Data
US 2025/0216290 A1 Jul. 3, 2025

(51) Int. Cl.
*G02B 21/36* (2006.01)
*G01M 11/00* (2006.01)
*G02B 21/06* (2006.01)

(52) U.S. Cl.
CPC ............ *G01M 11/30* (2013.01); *G02B 21/06* (2013.01); *G02B 21/365* (2013.01)

(58) Field of Classification Search
CPC .. G01M 11/30; G01M 11/31; G01M 11/3154; G01M 11/3145; G01M 11/35; G01M 11/37; G02B 21/06; G02B 21/08; G02B 21/36; G02B 21/361; G02B 21/364; G02B 21/365
See application file for complete search history.

(56) References Cited

U.S. PATENT DOCUMENTS

| | | | |
|---|---|---|---|
| 7,863,552 B2 * | 1/2011 | Cartlidge | G06T 3/10 359/368 |
| 9,498,135 B2 * | 11/2016 | Ghosh | H04N 23/69 |
| 10,788,657 B2 * | 9/2020 | Kawasaki | G02B 21/086 |

(Continued)

OTHER PUBLICATIONS

Hammond, "Symmetrical Ray Diagrams of the Optical Pathways in Light Microscopes", Institute for Materials Research, University of Leeds, UK and Julian Heath, Cambridge, UK, Sep. 2006, pp. 5-8.

*Primary Examiner* — Georgia Y Epps
(74) *Attorney, Agent, or Firm* — Mannava & Kang, P.C.

(57) ABSTRACT

Systems, methods, and devices for providing Köhler illumination for inspection, under a microscope, of end connectors of fiber optic cables. In one aspect, a microscopy system provides Köhler illumination where a numerical aperture of the illumination ($NA_{IL}$) is greater than a numerical aperture of imaging ($NA_{IM}$). In another aspect, a reflected light microscopy system includes an array of light sources which illuminate a diffuser, which, in turn, projects the diffused light to reflect off of a beamsplitter and through an objective/condenser upon the end connector. In yet another aspect, the array of light sources may provide different light patterns to illuminate the end connector, and each light pattern may correspond to a different type of radiused end connector.

20 Claims, 4 Drawing Sheets

(56) References Cited

U.S. PATENT DOCUMENTS

| | | | |
|---|---|---|---|
| 10,989,724 B1* | 4/2021 | Holmes | G01N 35/10 |
| 11,327,205 B2 | 5/2022 | Sales et al. | |
| 11,500,187 B2* | 11/2022 | Hubbard | G02B 21/14 |
| 11,927,811 B2* | 3/2024 | Cassady | H04N 23/55 |
| 11,986,267 B2* | 5/2024 | Ghosh | H04N 23/56 |
| 12,093,664 B2* | 9/2024 | Sakai | G02F 1/13 |
| 12,253,721 B2* | 3/2025 | Brace | G02B 6/385 |
| 2004/0008515 A1* | 1/2004 | Brown | G02B 21/16 |
| | | | 362/277 |
| 2004/0165778 A1* | 8/2004 | Cartlidge | G01N 21/6458 |
| | | | 382/211 |
| 2004/0227822 A1* | 11/2004 | Cartlidge | G01N 21/9501 |
| | | | 348/335 |
| 2004/0246479 A1* | 12/2004 | Cartlidge | G06T 3/40 |
| | | | 250/222.2 |
| 2018/0341097 A1* | 11/2018 | Kawasaki | G02B 21/086 |
| 2020/0393664 A1* | 12/2020 | Hubbard | G02B 21/14 |
| 2021/0405338 A9* | 12/2021 | Hubbard | G02B 21/0032 |
| 2022/0291455 A1* | 9/2022 | Brace | G02B 6/385 |
| 2023/0185030 A1* | 6/2023 | Cassady | G06T 7/60 |
| | | | 348/79 |
| 2023/0200656 A1* | 6/2023 | Ghosh | G02B 27/141 |
| | | | 348/80 |
| 2024/0184058 A1* | 6/2024 | Cassady | H04N 23/74 |

* cited by examiner

Köhler Illumination
(Reflected Light Microscope)

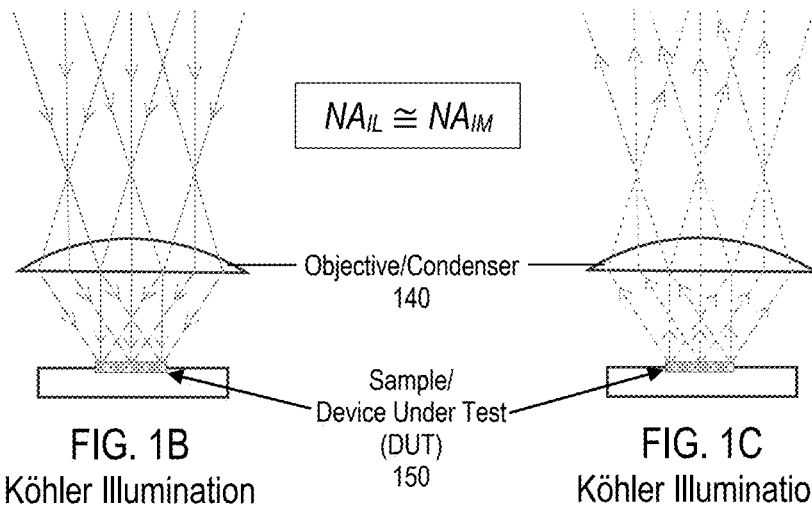
FIG. 1B
Köhler Illumination
(Illumination Ray Tracing)
FIG. 1C
Köhler Illumination
(Imaging Ray Tracing)
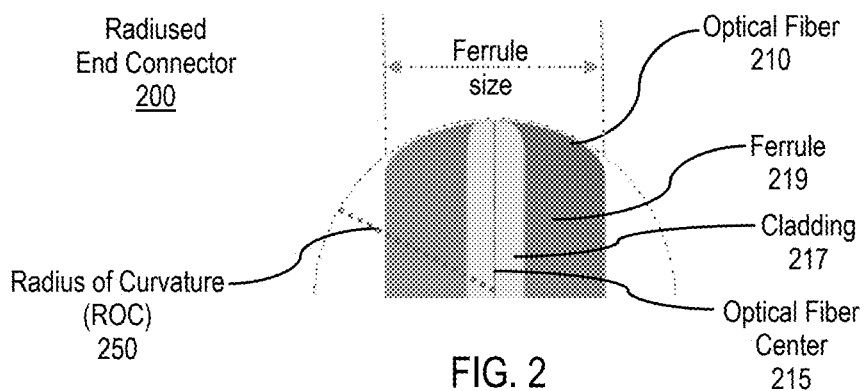
FIG. 2
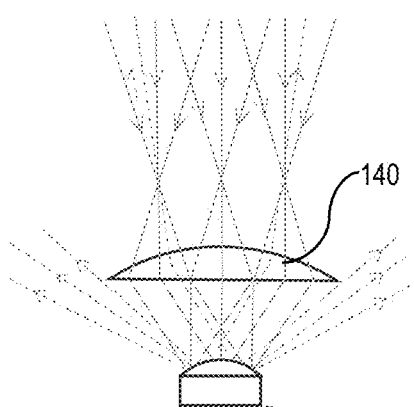
FIG. 3A
Standard Köhler
Illumination
($NA_{IL} \cong NA_{IM}$)
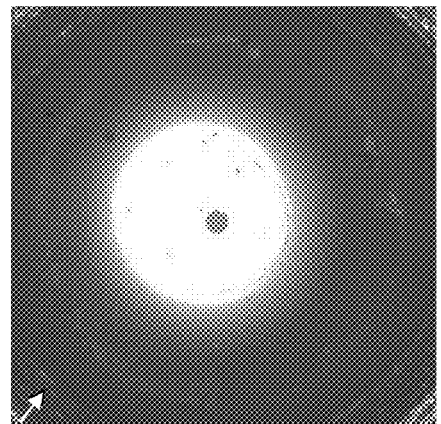
FIG. 3B
Imaging using standard
Köhler Illumination
($NA_{IL} \cong NA_{IM}$)

Imaging using Köhler Illumination
(where $NA_{IL} > NA_{IM}$)

Programmable LED Array
(planar view)

KÖHLER ILLUMINATION SYSTEM FOR INSPECTION OF RADIUSED END CONNECTORS

TECHNICAL FIELD

This disclosure is directed generally to the inspection of end connectors of fiber optic cables, and more specifically to using Köhler illumination when inspecting radiused end connectors of fiber optic cables by microscope.

BACKGROUND

Many networks use fiber optic cable for the transmission of communications, such as, e.g., telecommunication networks, Ethernet networks, etc. The end connectors of such fiber optic cable may need to meet a certain level of quality control for optimum usage, including, for example, a level of cleanliness and/or a lack of defects. In any setting where fiber optic equipment may be employed, microscopic equipment may be used to inspect hundreds to thousands of fiber optic end connectors. Generally speaking, any systems, apparatuses, and/or methods which may save time, reduce costs, increase efficiency, and/or otherwise improve such microscopic inspections may be beneficial.

BRIEF DESCRIPTION OF DRAWINGS

Features of the present disclosure are illustrated by way of example and not limited in the following figure(s), in which like numerals indicate like elements, in which:

FIGS. 1B and 1C are block diagrams illustrating the illumination path and the imaging path, respectively, through selected components in FIG. 1A, to which examples of the present disclosure may be applied.

FIG. 2 is a block diagram illustrating a radiused end connector, to which examples of the present disclosure may be applied.

FIG. 3A is a block diagram illustrating the illumination and the imaging paths of standard Köhler illumination (where the Numerical Aperture of the illumination ($NA_{IL}$) is roughly equal to the Numerical Aperture of the illumination ($NA_{IM}$)) to and from a radiused end connector, according to which examples of the present disclosure may be applied.

FIG. 3B is an image of a radiused end connector under standard Köhler illumination (where $NA_{IL}$ is roughly equal to $NA_{IM}$), according to which examples of the present disclosure may be applied.

DETAILED DESCRIPTION

Figure 1A:
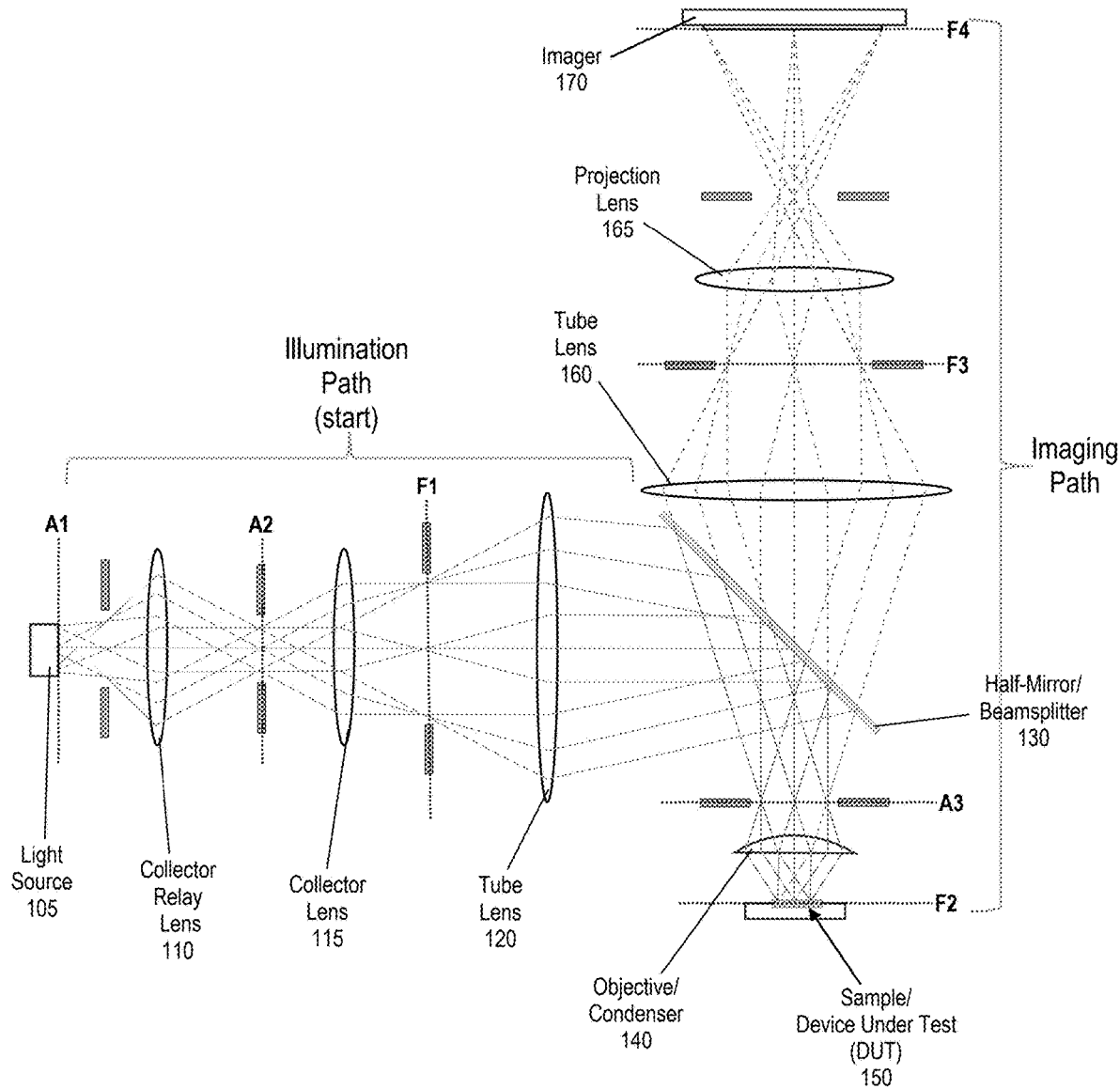
FIG. 1A is a block diagram illustrating Köhler illumination in a reflected light microscopy system, to which examples of the present disclosure may be applied.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As briefly referred to above, any user of any type of fiber optic equipment may need to use microscopy equipment to visually inspect and/or examine end connectors of fiber optic cable for a multitude of purposes, including, for example, quality control or for further polishing/cleaning in a manufacturing setting (e.g., detection of imperfections, etc.), inspection before use in the field (e.g., determining if dirty and/or usable, etc.), inspection before/during the testing of equipment, etc., as would be understood by one of ordinary skill in the art. However, there may be difficulties in visually inspecting/examining end connectors with uneven ferrule surfaces (such as, e.g., radiused end connectors), as discussed in more detail below in reference to an example in FIGS. 2, 3A, and 3B.

According to examples of the present disclosure, systems, methods, and apparatuses are provided for a microscopy system to project Köhler illumination on an end connector of a fiber optic cable. In some examples, a microscopy system may include an array of light sources which illuminate a diffuser which, in turn, projects the diffused illumination to reflect off of a half-mirror/beamsplitter and through an objective/condenser lens to project Köhler illumination on an end connector. In some examples, the array of light sources may be a programmable/controllable array of light sources which a user or the system itself may adjust to find the optimum lighting for the end connector being imaged; in some examples, the array may be in a circular pattern where one or more of the individual light sources are controllable to project different lighting patterns. In some examples, the diffuser or an image of the diffuser may be located at the back focal plane of the microscopy system. In some examples, the Numerical Aperture (NA) of illumination (i.e., the light projected onto the end connector) may be greater than the Numerical Aperture (NA) of imaging (i.e., the light reflected back from the end connector). In some examples, the systems, methods, and apparatuses provided herein may be suited for relatively low magnification (e.g., 2×).

According to examples of the present disclosure, a novel microscope objective, with a coaxial integrated programmable light source, is provided, which may enable optimal illumination of radiused end connectors. In some examples, a modified objective design may be provided where Köhler illumination can be injected in a location suitable to pass through with high angle of incidence (AOI) illumination pencils. In some examples, the light source may be placed in relation to the optics such that the Kohler condition regarding the back focal plane (BFP) may be achieved. In some examples, a programmable array of light sources may be dynamically reconfigured to provide Köhler illumination appropriate/suitable for an end connector with a particular shape/form (e.g., Radius of Curvature (ROC)). In some examples, the programmable array of light sources may be dynamically reconfigured to provide Köhler illumination with different Numerical Apertures (NAs) of illumination and/or with different angles of incidence (AOIs). In some examples, the programmable array of light sources may be individually addressed and controlled.

Some advantages and benefits of the devices, systems, and methods provided herein are mentioned above (or would be readily apparent in light of the above to one of ordinary skill in the art). As one example, the programmable lighting source provides customizable lighting that may accommodate a wide variety of types of end connectors. As another example, the modified objective design enables Köhler or near-Köhler illumination with a relatively large Numerical Aperture (NA) of illumination with a single objective lens. Further advantages and benefits of the devices, systems, and methods provided herein are described in greater detail below, while other benefits and advantages would be readily apparent to one of ordinary skill in the art even if they are not specifically discussed herein.

FIG. 1A is a block diagram illustrating Köhler illumination, one of the most common lighting techniques in optical microscopy, because it provides an even illumination of the sample or device under test (DUT) while preventing the light source from being imaged. FIG. 1A specifically illustrates the illumination and imaging paths of a reflected light microscope (i.e., in which the sample/DUT is both illuminated and imaged from the same side). FIG. 1A is adapted from FIGS. 4 and 5 of *Symmetrical Ray Diagrams of the Optical Pathways in Light Microscopes*, C. Hammond, MICROSCOPY & ANALYSIS 115:5 (September 2006), which is hereby incorporated by reference herein in its entirety. FIG. 1A is provided to illustrate the explanation below of Köhler illumination, and may omit aspects, features, and/or components not germane to examples of the present disclosure, as would be understood by one of ordinary skill in the art; moreover, the components shown in FIG. 1A may not be shown in accurate aspect and/or ratio of relative sizes.

As shown in FIG. 1A, the illumination path in a reflected light microscope using Köhler illumination may include a light source 105, a collector relay lens 110, a collector lens 115, a tube lens 120, a half-mirror/beamsplitter 130 which reflects and projects the reflected diffused illumination light to an objective/condenser lens 140, which focusses the light on a sample/DUT 150. The imaging path (i.e., the path taken by the light reflected back from the sample/DUT 150) starts at the sample/DUT 150, from which some of the reflected light may be received by the objective/condenser lens 140, pass through the half-mirror/beamsplitter 130, a tube lens 160, and a projection lens 165, which projects the light onto an imager 170. The imager 170, in turn, may capture an image based on the light received from the projection lens 165. The terms "half-mirror/beamsplitter" and "beamsplitter" may be used interchangeably herein to refer to any active or passive optical element(s) which may suitably split and direct the light in the illumination path and the light of the imaging path in a reflected light microscope, as would be understood by one of ordinary skill in the art.

As shown in FIG. 1A, Köhler illumination may include an aperture set of conjugate planes A1, A2, and A3, which may correspond to the light source 105 (A1), and planes where an image of the light source 105 may form (A2, A3). Köhler illumination may also include a field set of conjugate planes F1, F2, F3, and F4, where F1 is the conjugate plane where an illuminated field diaphragm may be located, F2 is the plane of the sample/DUT 150, F3 is the conjugate plane of the primary image of the sample/DUT 150, and F4 is the conjugate plane where an image forms on the imager 170, which may capture the image. As shown in FIG. 1A, there may be multiple points in the illumination path and the imaging path where a diaphragm may be used, as indicated by the pairs of shaded boxes in FIG. 1A, and several of these diaphragm locations correspond to conjugate planes (i.e., A2, F1, A3, and F3). Suitable setting of the illuminated field diaphragm at F1 and the aperture diaphragm at A3 may be crucial to obtaining appropriate field illumination of the sample/DUT 150, and optimum conditions of contrast and resolution.

FIGS. 1B and 1C are block diagrams illustrating the illumination path to, and the imaging path from, respectively, the sample/DUT 150 and through the objective/condenser lens 140 in FIG. 1A. In FIG. 1B, ray tracing is used to illustrate the illumination path through the objective/condenser lens 140 onto the sample/DUT 150; whereas, in FIG. 1C, ray tracing is used to illustrate the imaging path of the reflected light from the sample/DUT 150 back through the objective/condenser lens 140. As shown in FIGS. 1B and 1C, Köhler illumination is achieved as there is both even illumination and clear imaging of the sample/DUT 150.

The Numerical Aperture (NA) is a dimensionless number which characterizes the range of angles over which a system can receive or emit light, and thus may be used to characterize and/or measure how a microscope both illuminates and images a sample/DUT. There are varying definitions of Numerical Aperture (NA) depending on the field and the technology involved but generally speaking the Numerical Aperture (NA) may be defined as the sine of the half-angle of the maximum cone of light that can enter or exit the microscope (i.e., the light that can image or illuminate the sample/DUT). In most cases, such as the examples shown in FIGS. 1A-1C, the Numerical Aperture (NA) of the illumination (as shown in FIG. 1B) is about the same as the Numerical Aperture (NA) of the imaging (as shown in FIG. 1C). Hereinafter, the Numerical Aperture (NA) of the illumination (i.e., the light projected from the objective/condenser lens 140 towards the sample/DUT 150) may be referred to as "$NA_{IL}$" and the Numerical Aperture (NA) of the imaging (i.e., the light reflected back towards the objective/condenser lens 140 from the sample/DUT 150) may be referred to as "$NA_{IM}$."

As mentioned above, in any field that uses any type of fiber optic cable, there may be a need to inspect the end connectors of the fiber optic cable being used. Hereinafter the term "end connector" may be used to refer to any type of connector used in fiber optics, including, but not limited to, any Electronic Industries Alliance (EIA)/Telecommunication Industry Association end connector standard, as listed in the 604 series (e.g., "TIA-604-XX") and/or identified by a Fiber Optic Connector Intermateability Standard (FOCIS) document, and/or any International Electrotechnical Commission (IEC) standard. For example, the term "end connector" as used herein may refer to a simplex end connector; any type of Polished Connector (PC), such as, e.g., an Angled PC (APC), an Ultra PC, etc.; a Straight Terminus (ST) end connector (FOCIS-2/TIA-604-2); a Subscriber Connector or Snap-in Connector (SC) (FOCIS-3/TIA-604-3, IEC 61754-4, etc.); a Fiber Connector/Ferrule Connector/Fiber Channel (FC) (FOCIS-4/TIA-604-4); a Lightwave Connector (LC) (FOCIS-10/TIA-604-10); an LX-5 end connector (FOCIS-13/TIA-604-13); a MU end connector (FOCIS-17/TIA-604-17); a Multi-fiber Push-On/Pull-Off or Multi-Position Optical (MPO) end connector (12 fiber FOCIS-5/TIA-604-5, 16 fiber FOCIS-18/TIA-604-18, IEC 61754-7, etc.); a Sub Miniature A (SMA) end connector (e.g., IEC 61754-2); an MT-RJ end connector (e.g., FOCIS-12/TIA-604-12, IEC 61754-18, etc.); a Mechanical Transfer (MT) jack/connector; an E-2000 connector (IEC 61754-15);

an F-3000 connector (IEC 61754-20); any other standard interface/connector used for fiber optics (past, present, and future); and/or any other form of end connector suitable for use with fiber optics, as would be understood by one of ordinary skill in the art.

Certain types of end connectors have a rounded surface interface, which give such end connectors a Radius of Curvature (ROC), as will be discussed in reference to FIG. 2. Hereinafter, the term "radiused end connector" may refer to any type of end connector with a rounded ferrule surface and/or any type of non-flat/uneven interface surface which may not be effectively viewed by standard Köhler illumination (i.e., a microscopy system where $NA_{IL} \cong NA_{IM}$).

FIG. 2 is a block diagram illustrating a radiused end connector, according to an example. FIG. 2 is provided to illustrate an example of a radiused end connector, and may omit aspects, features, and/or components not germane to examples of the present disclosure, as would be understood by one of ordinary skill in the art; moreover, the components shown in FIG. 2 may not be shown in accurate aspect and/or ratio of relative sizes.

As shown in FIG. 2, a radiused end connector 200 may include an optical fiber 210 with an optical fiber center 215, cladding 217, and ferrule 219. The radiused end connector 200 may have a Radius of Curvature (ROC) 250, which is the radius of the circle formed if the curve at the surface interface of the end connector was continued out to form a circle, as indicated by the dash-dot curved line in FIG. 2—the ROC 250, i.e., the radius of that hypothetical circle, is indicated by the dotted line in FIG. 2. Although the optical fiber center 215 of the radiused end connector 200 in FIG. 2 is at the highest point of the curve, this is not the case with all radiused end connectors—for example, an APC has an angled ferrule surface (the angle ranges from about 5° to about 15°, but is typically around) 8° and thus the peak may be located at a different location. In such instances, the lateral distance between the fiber optic center and the peak or apex is called the "apex offset." A radiused end connector may also have an apex offset as an unintended result of manufacturing and there are certain industry-recognized tolerances for such accidental apex offsets. In general, an apex offset should be less than 50 millimeters (mms).

As shown in FIG. 2, a radiused end connector may have a ferrule size, which is the overall width of the fiber optic cable. Both the ferrule size and the ROC of a radiused end connector may be measured in millimeters (mms). For example, the ST, SC, and FC end connectors have a ferrule size of 2.5 mm and typically have an ROC from about 10 mm to about 25 mm, the LC and MU end connectors has a ferrule size of 1.25 mm and typically have an ROC from about 7 mm to about 25 mm, and APC end connectors may have various ferrule sizes but typically have an ROC from about 5 mm to about 12 mm.

While standard Kohler illumination (where $NA_{IL} \cong NA_{IM}$) may be acceptable for radiused end connectors with lower ROCs, standard Köhler illumination may not be suitable for radiused end connectors with higher ROCs. An example of this is discussed in reference to FIGS. 3A and 3B.

FIG. 3A is a block diagram illustrating the illumination and the imaging paths of standard Köhler illumination ($NA_{IL} \cong NA_{IM}$) to and from a radiused end connector, according to which examples of the present disclosure may be applied. In FIG. 3A, ray tracing is used to illustrate the illumination path through the objective/condenser lens 140 onto a radiused end connector 200 (indicated in solid lines) and the imaging path of the reflected light from the radiused end connector 200 back through the objective/condenser lens 140 (indicated in dashed lines). FIG. 3A is provided to illustrate an example of using standard Köhler illumination ($NA_{IL} \cong NA_{IM}$) on a radiused end connector, and may omit aspects, features, and/or components not germane to that example, or to examples of the present disclosure, as would be understood by one of ordinary skill in the art. Accordingly, the angles, relative sizes, aspects, and/or dispositions of any item shown in FIG. 3A are not intended to be accurate, but are rather intended to illustrate how standard Köhler illumination ($NA_{IL} \cong NA_{IM}$) may not be entirely effective for a radiused end connector. as would also be understood by one of ordinary skill in the art.

As shown in FIG. 3A, the light rays of the even illumination reflect off the sides of the radiused end connector 200, as the ferrule surface curves away from the peak of the radiused end connector 200. Accordingly, the light rays of the imaging path—i.e., the light reflected off the radiused end connector 200—from the sloping side ferrule surfaces of the radiused end connector 200 do not enter the objective/condenser lens 140 at all, and are thus not imaged by the microscopy system. A photograph illustrating this is shown in FIG. 3B.

FIG. 3B is an image of a radiused end connector under standard Köhler illumination ($NA_{IL} \cong NA_{IM}$), according to which examples of the present disclosure may be applied. Because the light reflected from the sloping curve of the surface of the radiused end connector does not return back to the objective/condenser lens 140 as shown in FIG. 3A, mostly the center of the image in FIG. 3B is illuminated, while regions away from the center of the radiused end connector are black, i.e., not imaged at all by the microscopy system.

According to examples of the present disclosure, devices and methods are provided for a microscopy system to project Köhler illumination on a radiused end connector such that its curved ferrule surface may be effectively imaged. In some examples, the microscopy system may include an array of light sources which illuminate a diffuser which, in turn, projects the diffused illumination off of a half-mirror/beamsplitter and through an objective/condenser lens to provide Köhler illumination with a high angle of incidence (AOI) suitable for illuminating a curved or uneven surface. In some examples, the optics and lighting of the microscopy system are such that the $NA_{IL}$ (i.e., the light projected onto the sample/DUT) may be greater than the $NA_{IM}$ (i.e., the light reflected back from the sample/DUT). In such examples, the diffuser, or an image of the diffuser, may be located at the back focal plane of the microscopy system. In some examples, the microscopy system may include a programmable/controllable array of light sources which a user or the system itself may adjust to find the optimum lighting for the sample/DUT being imaged; in some examples, the array of light sources may be in a circular pattern where one or more of the individual light sources are controllable to project different lighting patterns.

A microscopy system according to examples of the present disclosure may provide Kohler illumination that is uniform and invariant on any end connector with an uneven, slanted, curved, and/or otherwise non-uniform ferrule surface. In some examples, the microscopy system may adapt to end connectors with different ferrule surfaces (including flat/planar ferrule surfaces) by having a programmable/controllable array of light sources which provide different light patterns that result in illumination with different characteristics (such as, e.g., different angles of incidence (AOIs) and/or different $NA_{IL}$s). In some examples, a user or the microscopy system itself may adjust the programmable/ controllable array of light sources to find the optimum lighting for the sample/DUT being imaged; in some examples, the array of light sources may be in a circular pattern where one or more of the individual light sources are controllable to project different lighting patterns. In some examples, the microscopy system may provide optimal brightfield images, having a cost-effective objective design which allows the microscopy system to have a large $NA_{IL}$ relative to the $NA_{IM}$.

Figures 4A, 4B, 4C:
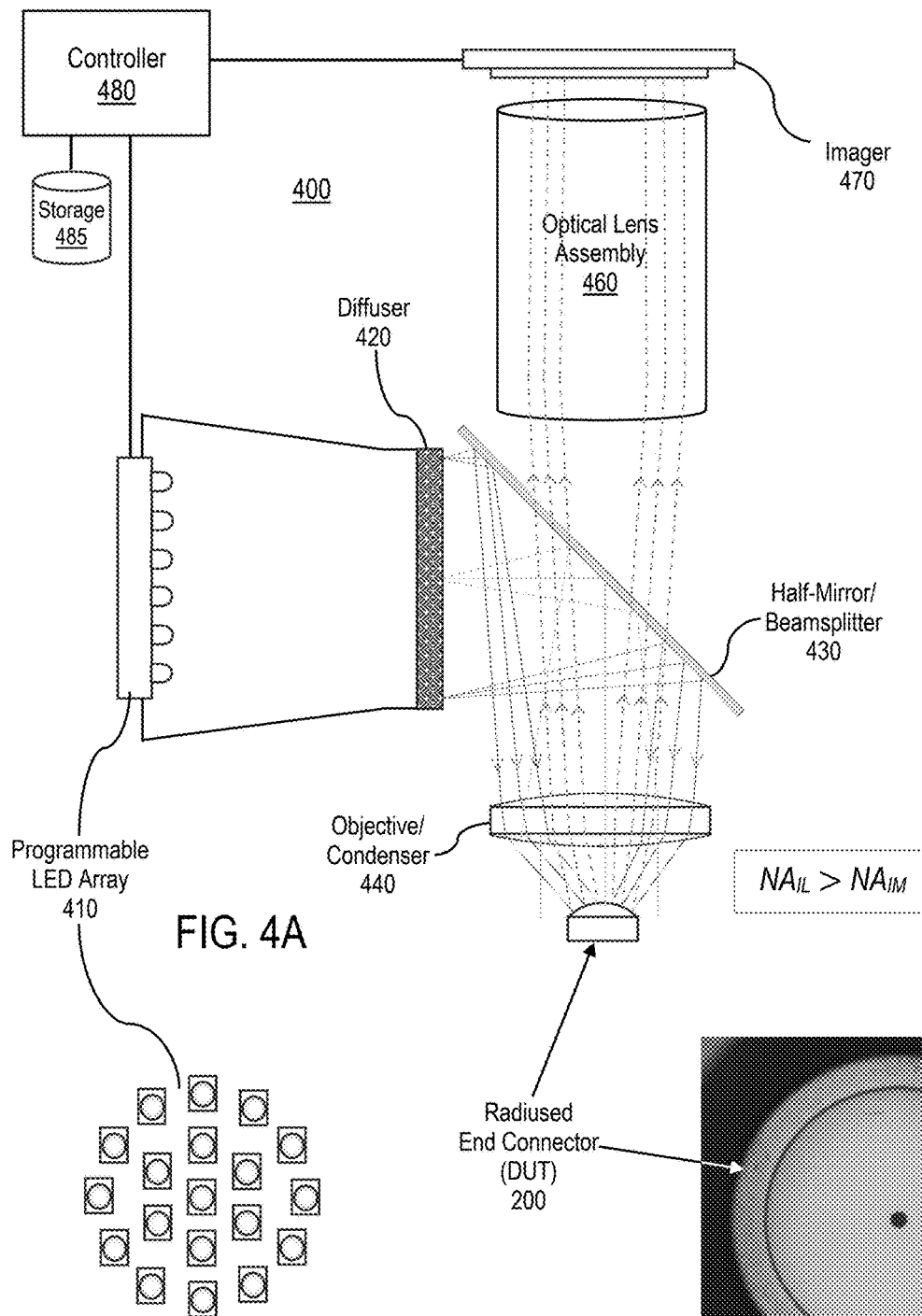
FIG. 4A is a block diagram illustrating a microscopy system that may provide Kohler illumination of a radiused end connector, where $NA_{IL}$ is greater than $NA_{IM}$, according to an example of the present disclosure.
FIG. 4B is an image of a radiused end connector under Köhler illumination where $NA_{IL}$ is greater than $NA_{IM}$, according to an example of the present disclosure.
FIG. 4C is a planar view of the programmable array of light sources in FIG. 4A, according to an example of the present disclosure.

FIG. 4A is a block diagram illustrating a microscopy system that may provide Köhler illumination (where $NA_{IL} > NA_{IM}$) of a radiused end connector, according to an example of the present disclosure. FIG. 4A is provided to illustrate the explanation below of an example of the present disclosure, and may omit aspects, features, and/or components not germane to examples of the present disclosure, as would be understood by one of ordinary skill in the art; moreover, the components shown in FIG. 4A may not be shown in accurate aspect and/or ratio of relative sizes.

As shown in FIG. 4A, a microscopy system 400 according to an example of the present disclosure may include a light source, which may include a programmable Light Emitting Diode (LED) array 410 and a diffuser 420, which projects diffused illumination towards a half-mirror/beamsplitter 430, which, in turn, projects the reflected diffused illumination through an objective/condenser 440 onto the radiused end connector 200. The imaging path of light reflected back from the radiused end connector 200 enters the objective/condenser 440 and is projected back through the half-mirror/beamsplitter 430 into an optical lens assembly 460 which provides an image to an imager 470, which may capture the image. The optical lens assembly 460 may include any number of optical and electronic elements suitable for the specific implementation of the microscopy system 400 and the imager 470, as would be understood by one of ordinary skill in the art. The imager 470 and the programmable LED array 410 may be controlled by a controller 480 which may include a storage 485.

As shown in FIG. 4A, the projected diffused illumination from the diffuser 420 is reflected from the half-mirror/beamsplitter 430 and into the objective/condenser 440 such that the illumination of the radiused end connector 200 may have a large angle of incidence (AOI), particularly from the periphery of the objective/condenser 440, as shown by the illumination pencil rays striking the curved sides of the ferrule surface in FIG. 4A. In some examples, the diffuser 420 is positioned at the back focal plane (BFP), which proximity to the imaging path may help achieve the high angle of incidence (AOI) for illuminating the curved side surfaces of the radiused end connector 200. In other examples, an image of the diffuser 420 is positioned at the back focal plane (BFP), which also effectively achieves the high AOI for illuminating the curved side surfaces of the radiused end connector 200.

In the construction shown in FIG. 4A, the Numerical Aperture (NA) of the illumination (i.e., the light projected from the objective/condenser 440 towards the radiused end connector 200) $NA_{IL}$ has a larger value than the Numerical Aperture (NA) of the imaging (i.e., the light reflected back towards the objective/condenser 440 from the radiused end connector 200) $NA_{IM}$ (i.e., $NA_{IL} > NA_{IM}$). In some examples, the half-angle α of the maximum cone of light illuminating the radiused end connector 200 may be about 18°, resulting in a $NA_{IL}$=0.31, and the half-angle α of the maximum cone of light reflecting back from the radiused end connector 200 may be about 3°, resulting in a $NA_{IM}$=0.05.

Generally speaking, in accordance with examples of the present disclosure, either (1) the diffuser is disposed at the back focal plane (BFP); or (2) an image of the diffuser is formed at the BFP (i.e., the rays of illumination from the diffuser come into focus, or form an image, at this plane in the set of aperture conjugate planes of illumination). In some examples, such as the example shown in FIG. 4A, the diffuser 420 may be disposed at the back focal plane (BFP) of the illumination path. In the example of FIG. 4A, the only lens in the illumination path is the objective/condenser 440, but any combination of lenses and/or optical elements may be employed in the illumination path in accordance with the present disclosure, as long as the conditions for disposing the diffuser (or its image) are met. The combination of lenses and/or optical elements in the illumination path may be referred to as "the illumination-lensing elements" herein. In order to achieve a suitable/appropriate angle-of-incidence (AOI) for effectively illuminating a sample/DUT with a profiled/uneven/3D surface, such as, e.g., a radiused end connector (or equivalently, to achieve a $NA_{IL} \geq NA_{IM}$ condition suitable for effectively illuminating a sample/DUT with a profiled/uneven/3D surface, such as, e.g., a radiused end connector), (i) the diffuser (acting as the effective light source) should be disposed sufficiently close to the illumination-lensing-elements, and (ii) the illumination-lensing-elements should have a sufficiently large clear aperture to accommodate the off-axis positioning of the diffuser ("off-axis" in the sense that it is positioned far from the central axis of the optical system), as would be understood by one of ordinary skill in the art.

FIG. 4B is an image of a radiused end connector under Köhler illumination where $NA_{IL} > NA_{IM}$, according to an example of the present disclosure. As indicated by the light rays in FIG. 4A, because the light illuminating the radiused end connector 200 may have a larger angle of incidence (AOI), the light reflected from the sloping curve of the surface of the radiused end connector 200 returns back to the objective/condenser 440 as shown in FIG. 4A, so the image in FIG. 4B shows the entire curved surface of the radiused end connector illuminated, by contrast with the largely darkened image in FIG. 3B, where a typical construction and standard Köhler illumination (i.e., $NA_{IL} \cong NA_{IM}$) were employed.

In some examples, the $NA_{IL}$ may be varied by changing a lighting pattern of the programmable LED array 410, thereby changing the effective angle of incidence (AOI) of the illumination of the radiused end connector 200. For different sizes of radiused end connectors, different angles of incidence (AOIs) may be more effective, suitable, and/or appropriate for imaging purposes. For instance, a simplex end connector with a ferrule size of 2.5 mm and a ROC of 8 mm may be suitably lit by half-angle α of about 18° ($NA_{IL}$=0.31). As another instance, a simplex end connector with a ferrule size of 1.25 mm and a ROC of 5 mm may be suitably lit by half-angle α of about 14.4° ($NA_{IL}$=0.25). Accordingly, the $NA_{IL}$ of the microscopy system 400 may be modified depending on the ferrule size and ROC of the radiused end connector being imaged by varying the light pattern of the programmable LED array 410. In some examples, the user of the microscopy system 400 may change the lighting pattern directly; in other examples, the controller 480 may automatically set the lighting pattern based on the detected ferrule size and ROC of the radiused end connector being imaged. In some examples, the controller 480 may automatically image and vary the lighting pattern until an optimum $NA_{IL}$ is achieved.

Generally speaking, in accordance with examples of the present disclosure, the diffuser 420 may have sufficient roughness, or "grit," to homogenize the light from the light source (e.g., the programmable LED array 410), thereby providing a more balanced luminosity profile to the half-mirror/beamsplitter 430. A suitable position of the diffuser 420 relative to the programmable LED array 410 may be found relatively easily by balancing (1) the overall throughput of the light (i.e., the diffuser 420 must not attenuate too much of the light from the programmable LED array 410); and (2) the overall homogenization of the light (e.g., mitigating the appearance of bright spots corresponding to the individual light sources in the programmable LED array 410). Typically, the diffuser 420 may be relatively close to the half-mirror/beamsplitter 430, but not actually touching the half-mirror/beamsplitter 430. In examples where there may be thermal issues (e.g., when plastic polymer lenses are used), the diffuser 420 may be placed to ensure any changes in the temperature-sensitive elements will not change its overall effectiveness nor significantly change its position relative to the temperature-sensitive elements. As an extreme example, at high temperatures temperature-sensitive components may expand to the extent that the diffuser 420 may touch or effectively connect with the half-mirror/beamsplitter 430, which in most cases may be detrimental to overall functioning of the microscopy system 400. The considerations raised in this paragraph are general guidelines and should not be interpreted to exclude any particular construction. For instance, a construction where the diffuser 420 and the half-mirror/beamsplitter 430 have physical contact or effectively touch may be contemplated in accordance with the present disclosure, as long as the appropriate conditions for a relatively high angle-of-incidence (AOI) and/or $NA_{IL} \geq NA_{IM}$ are still met, as would be understood by one of ordinary skill in the art.

In some examples, the diffuser 420 may include ground glass (e.g., N-BK7, UV Fused Silica (UVSF), etc.), suitable plastics, fused silica, amorphous silicon, and/or any other suitable optical material, with or without a coating, and may have a grit from about 120 to about 1500. In some examples, the diffuser 420 may be an active element. In some examples, the surface of the diffuser 420 may be created by grinding, embossing, molding, reactive-ion etching, etc., as would be understood by one of ordinary skill in the art. In some examples, the diffuser 420 may have a periodic, non-periodic, and/or random pattern, and/or microstructures on its surface. In some examples, the diffuser 420 may be a diffractive diffuser, a Gaussian diffuser, and/or include a microlens array. In some examples, the diffuser 420 may be formed of multiple layers, including one or more encapsulated layers (see, e.g., U.S. Pat. No. 11,327,205 assigned to the same assignee, which is hereby incorporated by reference in its entirety).

In some examples, the programmable LED array 410 may include a circular pattern of one or more rings of LEDs around a center LED. In some examples, the programmable LED array 410 may form other shapes such as, e.g., a rectangle, an ellipse, etc.; in some examples, there may be only one LED; in other examples, the light source for the microscopy system 400 may be entirely different, as discussed in further detail below. In some examples, each LED in the programmable LED array 410 may be individually controllable by the controller 480; in other examples, groups of LEDs within the programmable LED array 410 may be separately controllable (such as, e.g., each ring of LEDs in a circular array). In some examples, one or more parameters of the LEDs in the programmable LED array 410, in addition to the simply powering on and off, such as, e.g., intensity, wavelength, etc., as would be understood by one of ordinary skill in the art.

FIG. 4C is a planar view of the programmable LED array 410 in FIG. 4A, according to an example of the present disclosure. FIG. 4C is provided as a specific example of an LED array and is in no way limiting to the type, form, positioning, and/or construction of light sources which may be employed in accordance with examples of the present disclosure. In FIG. 4C, the programmable LED array 410 may include 19 separate LEDs in a circular pattern with an outer circle of 12 LEDs, an inner circle of 6 LEDs, and a single center LED. In some examples, any one or any combination of the outer circle, inner circle, and the center LED may be employed to provide suitable illumination for the radiused end connector being imaged. In some examples, the intensity and/or wavelength of the outer circle, inner circle, and the center LED may be separately controlled by the controller 480.

In some examples, the relative intensity of the pencils of light from each LED in the programmable LED array 410 may be changed, thereby effectively changing the $NA_{IL}$. In such examples, the controller 480 may change the current driving one, more, or all LEDs in the programmable LED array 410 in order to change the relative intensity of the pencils of light from the LEDs in the programmable LED array 410. For instance, if each LED in the outer circle of LEDs were driven by a 150 mA current, while the central on-axis LEDs were driven by a 10 mA current, the high intensity light projected at the outer circle may effectively result in higher angle-of-incidence (AOI) light on the sample/DUT. Generally speaking, the further the LED is from the center of the programmable LED array 410, the more attenuated the light from that LED. Accordingly, to achieve the same intensity at the sample/DUT, the current driving each LED must have a greater and greater intensity the further the LED is from the center of the programmable LED array 410. This is part of the reason why, in the example earlier in this paragraph, the ratio of the current for an outer ring LED to the central LED was 15:1. In any event, by appropriately varying the currents driving one, more, or all LEDs in the programmable LED array 410, the controller 480 may find an optimal lighting pattern to illuminate any radiused end connector, with any arbitrary ROC—i.e., the controller 480 may find the lighting pattern effectively creating the most suitable/effective AOI and/or $NA_{IL}$ for the curvature of that radiused end connector.

In some examples, the light source illuminating the diffuser 420 may not be an LED array, but rather any other variable and controllable light source, such as, e.g., a light panel (e.g., a liquid crystal display (LCD) panel, a liquid-crystal-on-silicon (LCoS) display panel, an organic light-emitting diode (OLED) display panel, a micro light-emitting diode (micro-LED) display panel, a digital light processing (DLP) display panel, or any other suitable light source in panel form, as would be understood by one of ordinary skill in the art).

In other examples, the illumination for the microscopy system 400 may not be the programmable LED array 410 and the diffuser 420 as shown and disposed in FIG. 4A. In some examples, the illumination for the microscopy system 400 may include multiple diffusers; a screen, a grating, or other optical element suitable for diffusing light; one or more reflectors and/or reflective surfaces; one or more condenser lenses, and/or any other optical elements suitable for providing illumination in accordance with the present disclosure.

The imager 470 may include one or more image sensors, cameras, and/or any other device capable of capturing images and/or video in accordance with the present disclosure, as would be understood by one of ordinary skill in the art. In some examples, the imager 470 may be a digital camera which may use one or more semiconductor imaging sensors and may or may not use optics and a variable aperture. In some examples, the optics, aperture, etc., may be effectively replaced by digital signal processing (DSP) of the data received by the semiconductor imaging sensors. In some examples, the imager 470 may be at least one of a charge-coupled device (CCD) or an active pixel sensor, also known as a complementary metal oxide semiconductor (CMOS) sensor. In other examples, the imager 470 may be other forms of metal oxide semiconductor (MOS) based sensors, such as, e.g., an n-type metal oxide semiconductor (nMOS) integrated circuit chip, or a modified metal oxide semiconductor (MOS) dynamic random access memory (RAM) chip.

In some examples, the imager 470 may be a separate component from the microscopy system 400; in other examples, the imager 470 may be the imager for multiple optical lens assemblies forming multiple illumination and imaging paths. In some examples, the imager 470 may take single images, series of images, video, and/or other forms of imaging suitable for examples of the present disclosure, as would be understood by one of ordinary skill in the art. Like the LEDs in the programmable LED array 410, the imager 470 may be addressable and controllable by the controller 480.

The controller 480 may control the programmable LED array 410 and the imager 470 by executing instructions which may be stored in the storage 485. The controller 480 may receive input, store, and process data, and/or control the imager 470 and/or the LEDs of the programmable LED array 410 in accordance with received input, stored/processed data, and/or executable instructions stored in the storage 485. In some examples, the controller 480 may be part of a separate system which may be connected and/or attached to the microscopy system 400 for usage/implementation. In some examples, the controller 480 may not be a separate component from the microscopy system 400, but rather may be implemented in an already-existing processor connected to and/or already integrated into the microscopy system 400. In some examples, the controller 480 may include one or more processors. In some examples, the controller 480 may be, for example, a System-on-Chip (SoC), an application specific integrated circuit (ASIC), a field programmable gate array (FPGA), and/or other device/system on which may be stored the executable instructions, and thus such a microscopy system 400 may not have a storage 485 separate from the processor. In some examples, the controller 480 may include, for example, a central processing unit (CPU), a general purpose single- and/or multi-chip processor, a single- and/or multi-core processor, a digital signal processor (DSP), one or more other programmable logic devices, and/or any combination thereof suitable to perform the functions described herein, as would be understood by one of ordinary skill in the art.

The storage 485 may include a non-transitory computer-readable storage medium/media storing instructions executable by the controller 480, as well as storing input, images, and other data as described in reference to examples of the present disclosure. The non-transitory computer-readable storage medium/media included in the storage 485 may be any memory, such as a hard disk drive, a removable memory, or a solid-state drive (e.g., flash memory, Random Access Memory (RAM), Dynamic RAM (DRAM), Electrically Erasable Programmable Read-Only Memory (EEPROM), etc.), or the like, as would be understood by one of ordinary skill in the art.

As discussed above, some examples of the present disclosure provide for the microscopy system to change its lighting patterns to match the ferrule surface of the end connector being imaged. In some examples, the user of the microscopy system 400 may provide input to the controller 480 in order to find the most suitable lighting pattern for imaging the end connector. In this context, a "lighting pattern" may be any combination of powering on or off one or more LEDs in the programmable LED array 410 (which may create a spatial pattern such as, e.g., a circle by only lighting the outer ring of LEDs, a half-moon by lighting only one side of the array, etc.), changing the wavelength, intensity, polarization, and/or other parameter of one or more LEDs in the programmable LED array 410, powering on/off and/or changing one or more parameters in a timed sequence, etc., as would be understood by one of ordinary skill in the art. In some examples, the user may identify the type of end connector and the controller 480 may automatically set the matching lighting pattern. In some examples, the controller 480 may attempt to identify the end connector being imaged by detecting one or more known characteristics and/or indicia (such as, e.g., a shape, a color, a configuration, a form of identification such as a bar code or QR code, etc.). In some examples, the controller 480 may attempt to determine the most suitable lighting pattern by varying one or more parameters of one or more LEDs in the programmable LED array 410 while also performing imaging with the imager 470 (an example of this is discussed in reference to FIG. 5).

Figure 5:
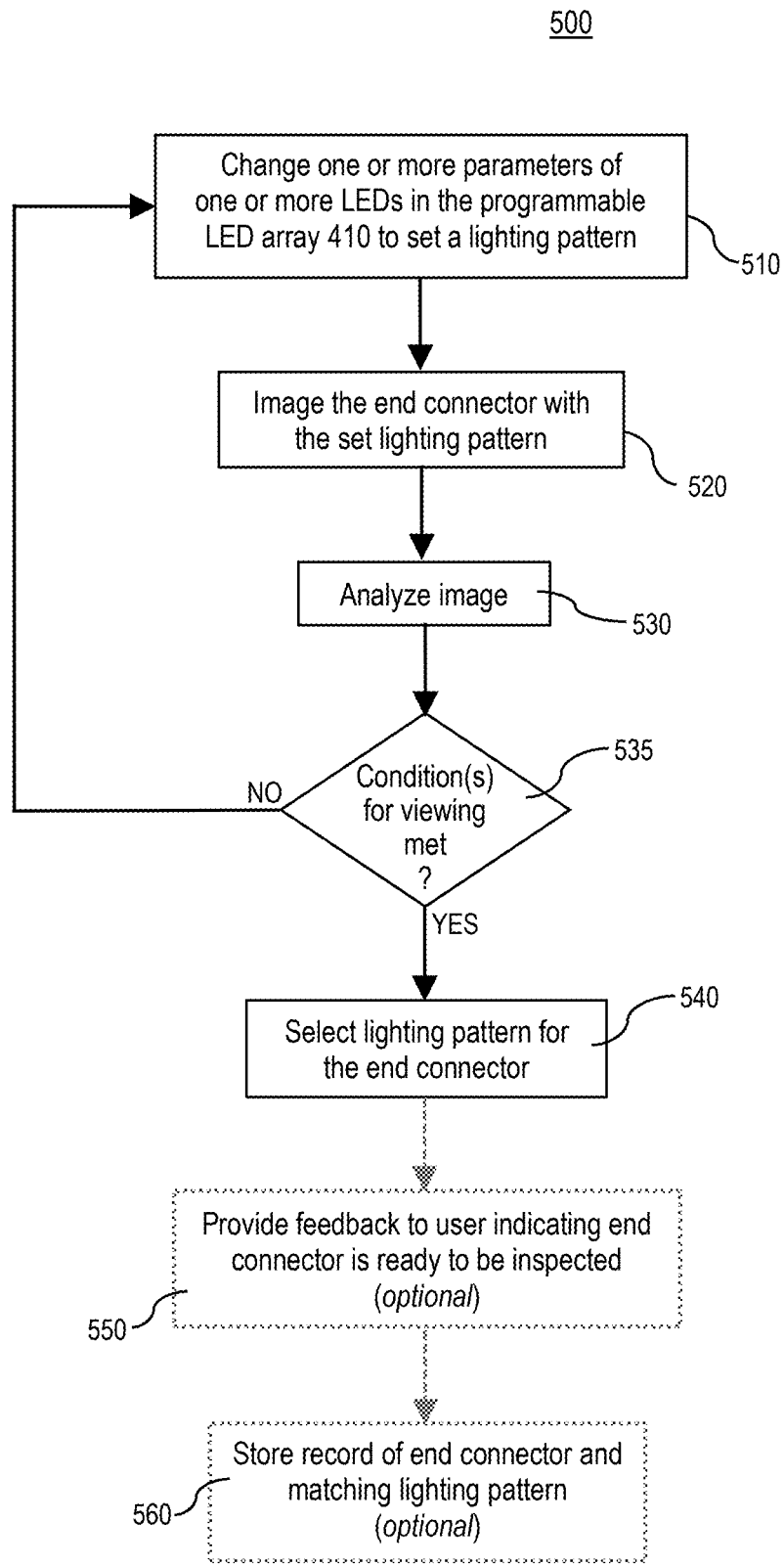
FIG. 5 illustrates a flow diagram of a method to visually inspect and select a suitable lighting pattern for an end connector, according to an example of the present disclosure.

FIG. 5 illustrates a flow diagram of a method for the controller 480 to visually inspect and select a suitable lighting pattern for an end connector currently being imaged, inspected, and/or otherwise examined, according to an example of the present disclosure. The method 500 shown in FIG. 5 is provided by way of example and may only be one part of an entire process/procedure. The method 500 may further omit parts of the method not germane to the present disclosure, as would be understood by one of ordinary skill in the art. Each block shown in FIG. 5 may further represent one or more steps, processes, methods, or subroutines, as would be understood by one of ordinary skill in the art. For the sake of convenience and ease of explanation, the blocks in FIG. 5 may refer to the components in FIG. 4 and/or descriptions of the other figures described herein; however, the method 500 is not limited in any way to the components, apparatuses, and/or constructions shown in any of the figures described herein.

In blocks 510, 520, 530, and 535, the method 500 performs a reiterative process of changing one or more parameters of one or more LEDs of the programmable LED array 410, imaging an end connector with those set parameters, and then determining whether one or more conditions for viewing are met (to end the reiterative process). The method 500 may be initiated when either the microscopy system 400 recognizes an end connector is ready for inspection/examination and/or when the user indicates he or she wants to inspect an end connector.

At block 510, the controller 480 may control to set or change one or more parameters of one or more of the LEDs in the programmable LED array 410 to provide a lighting pattern to the end connector being imaged. As stated above, a "lighting pattern" may be any combination of powering on or off one or more LEDs in the programmable LED array 410, changing the wavelength, intensity, polarization, and/or other parameter of one or more LEDs in the programmable LED array 410, powering on/off and/or changing one or more parameters in a timed sequence, etc., as would be understood by one of ordinary skill in the art. In some examples, the light pattern may be a spatial pattern such as a shape or form made up of lit LEDs against a background of unlit LEDs (such as, e.g., a large circle by only lighting the outer ring of LEDs, a small circle by only lighting the inner ring of LEDs, a half-moon by lighting only one side of the array, a crescent by lighting one half of one of the inner and outer circles, etc.)

At block 520, the controller 480 may control the imager 470 to capture an image of the end connector while the light pattern set in block 510 is used to illuminate the end connector. In some examples, the controller may take more than one image in block 520 such as, e.g., if the light pattern set in block 510 included a time sequence of changes.

At block 530, the controller 480 may analyze the image(s) from block 520 to assess, for example, the quality of the illumination of the end connector using the set light pattern. In some examples, the controller 480 may analyze the quality of the illumination by detecting the relative darkness and light of the overall image—i.e., how much of the end connector may be getting imaged with the set lighting pattern.

At block 535, the controller 480 may determine whether one or more conditions for viewing are met. In some examples, the one or more conditions for viewing may include, e.g., certain quality/quantifiable thresholds for effective imaging, inspection, and examination (including meeting industry and/or other widely accepted standards); user-entered goals or parameters; and/or a timeout (e.g., if no acceptable/qualifying conditions are found after a certain number of iterations and/or after a certain amount of time, the controller 480 defaults to failure mode and indicates so to the user). In some examples, the one or more conditions for viewing may include industry standards and/or other widely accepted standards. When the one or more conditions for viewing are met in block 535, the method 500 proceeds to block 540.

At block 540, the controller 480 may select and use the lighting pattern which met the one or more conditions for viewing in block 535 (assuming that qualifying conditions have been met, and the method did not time out at block 535). At this point, the method 500 may end, and either the controller 480 and/or the user may perform the inspection, examination, etc., using the imaging enabled by the selected lighting pattern. In some examples, the method 500 may not end, but may continue on to perform one or both of blocks 550 and 560.

At block 560, in some examples, the controller 480 may provide feedback to the user indicating that the end connector may now be imaged. In some examples, the controller 480 may provide any of a wide variety of feedback, including, but not limited to, measurements indicating the end connector may not meet certain requirements and/or standards; feedback identifying any defects, irregularities, surface particulates, and/or other imperfections; and feedback indicating whether any identified surface particulates are cleanable, i.e., are removable from the ferrule surface of the end connector. In some examples, this feedback may be an image, a series of images, and/or a video generated by the controller 480. In some examples, this feedback may include visual indicia indicating defects, irregularities, surface particulates, and/or other imperfections in an image, a series of images, and/or a video. In such examples, the visual indicia may be, for example, a color code, a label, an icon, added shadowing/shadows, added visual changes in the shapes/features, or any other sort of visual indication, as would be understood by one of ordinary skill in the art. In some examples, the controller 480 may provide the user with actionable information—i.e., information which may provide guidance as to what steps the user should perform next, based on the analysis of the controller 480.

In some examples, the controller 480 may use multiple different light techniques/modalities, such as, for example, both darkfield and brightfield illumination. In such examples, the controller 480 may combine images made using the multiple different light techniques/modalities, such as, for example, making an image combining both darkfield and brightfield illumination. In some examples, digital signal processing and/or a similar technique may be used to perform one or more blocks in FIG. 5 and/or any other analysis, determination, calculation, etc., as described herein, as would be understood by one of ordinary skill in the art.

In examples according to the present disclosure, the method 500 (whether performed, in whole or in part, by the controller 480 in the example of FIG. 4 or another component of the microscopy system 400) may be implemented by at least one of any type of application, program, library, script, task, service, process, or any type or form of executable instructions executed on hardware such as circuitry that may include digital and/or analog elements (e.g., one or more transistors, logic gates, registers, memory devices, resistive elements, conductive elements, capacitive elements, and/or the like, as would be understood by one of ordinary skill in the art). In some examples, the hardware and data processing components used to implement the various processes, operations, logic, and circuitry described in connection with the examples described herein may be implemented with a general purpose single- and/or multi-chip processor, a single- and/or multi-core processor, a digital signal processor (DSP), an application specific integrated circuit (ASIC), a field programmable gate array (FPGA), or other programmable logic device, discrete gate or transistor logic, discrete hardware components, and/or any combination thereof suitable to perform the functions described herein. A general purpose processor may be any conventional processor, microprocessor, controller, microcontroller, and/or state machine. In some examples, the storage 485 may include one or more components (e.g., random access memory (RAM), read-only memory (ROM), flash or solid state memory, hard disk storage, etc.) for storing data and/or computer-executable instructions for completing and/or facilitating the processing and storage functions described herein. In some examples, the storage 485 may be non-volatile memory, and may include database components, object code components, script components, or any other type of information structure suitable for implementing the various activities and storage functions described herein.

In one aspect, the present disclosure describes a microscopy system, which may include: a light source to provide illumination; a diffuser to receive and diffuse the illumination from the light source, and to project the diffused illumination; a beamsplitter to receive and reflect the diffused illumination; and an objective to receive and project the reflected diffused illumination upon a device under test (DUT); where either the diffuser or an image of the diffuser is disposed at the back focal plane of the objective such that the microscopy system provides Köhler illumination to the DUT where a numerical aperture of illumination ($NA_{IL}$) is greater than a numerical aperture of imaging ($NA_{IM}$).

In one aspect, the present disclosure describes a microscopy system for inspection of an end connector of a fiber optic cable, which may include: a controller; an imager operably connected to the controller to image an end connector; a light source operably connected to the controller to provide illumination; a diffuser to receive and diffuse the illumination from the light source, and to project the diffused illumination; a beamsplitter to receive and reflect the diffused illumination; an objective to receive and project the reflected diffused illumination upon the end connector, wherein either the diffuser or an image of the diffuser is disposed at the back focal plane of the objective; and a storage to store machine-readable instructions that, when executed by the controller, cause the controller to: control the light source to provide the illumination to the diffuser such that the reflected diffused illumination provides Köhler illumination to the end connector; and when the end connector is a radiused end connector, control the light source to provide the illumination to the diffuser such that a numerical aperture of illumination ($NA_{IL}$) of the radiused end connector is greater than a numerical aperture of imaging ($NA_{IM}$) of the radiused end connector.

In some examples, when the end connector is a radiused end connector, the controller may control the light source to provide a lighting pattern to illuminate the diffuser, where that lighting pattern corresponds to a $NA_{IL}$ which corresponds to the radiused end connector. In some examples, the storage may store different lighting patterns that correspond to different $NA_{IL}$s which correspond to different types of radiused end connectors.

In some examples, the light source may include an array of light sources to illuminate the diffuser. In some examples, the light pattern may be a spatial pattern of lit and unlit light sources in the array of light sources. In some examples, the controller may control the array of light sources to provide the lighting pattern by controlling one or more light sources in the array to at least one of turn on, turn off, change intensity, change wavelength, or change polarity.

In one aspect, the present disclosure describes a method for viewing, by a microscopy system, an end connector of a fiber optic cable, which may include the steps of: (a) changing, by a controller, one or more parameters of an array of light sources, wherein the array of light sources provides illumination to a diffuser which projects diffused illumination to reflect off of a beamsplitter through an objective to illuminate an end connector; (b) controlling, by the controller, an imager to capture an image corresponding to the changed one or more parameters; (c) analyzing, by the controller, the captured image to determine if a condition for viewing is met; and (d) when the condition for viewing is not met, repeating steps (a), (b), and (c); and (e) when the condition for viewing is met, maintaining a lighting pattern of the array of light sources with the one or more parameters which provided the illumination for the image which met the condition for viewing.

In some examples, after step (e), the method may include providing, by the controller, feedback indicating the end connector may be viewed. In some examples, before step (a), the method may include receiving, by the controller, input indicating how the one or more parameters are to be changed in step (a). In some examples, the controller may automatically determine how the one or more parameters are to be changed in step (a). In some examples, the method may include, after step (e), storing, by the controller, the lighting pattern which met the condition for viewing of the end connector, in a storage. In some examples, the method may include, after step (e), a step (f) of controlling, by the controller, the imager to capture an image corresponding to the lighting pattern; and a step (g) of storing, by the controller, the captured image.

While examples described herein are directed to configurations as shown, it should be appreciated that any of the components described or mentioned herein may be altered, changed, replaced, or modified, in size, shape, and numbers, or material, depending on application or use case, and adjusted for desired resolution or optimal measurement results. Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A microscopy system, comprising:
   a light source to provide illumination;
   a diffuser to receive and diffuse the illumination from the light source, and to project the diffused illumination;
   a beamsplitter to receive and reflect the diffused illumination;
   an objective to receive and project the reflected diffused illumination upon a device under test (DUT); and
   an imager to image the DUT by receiving reflected light from the DUT via the objective;
   wherein either the diffuser or an image of the diffuser is disposed at the back focal plane of the objective to provide Köhler illumination to the DUT where a numerical aperture of illumination ($NA_{IL}$) is greater than a numerical aperture of imaging ($NA_{IM}$).

2. The microscopy system of claim 1, wherein the light source comprises:

an array of light sources disposed in a circular pattern to illuminate the diffuser.

3. The microscopy system of claim 2, wherein the array of light sources comprises:
an array of light emitting diodes (LEDs).

4. The microscopy system of claim 2, further comprising:
a controller to control the array of light sources to provide different lighting patterns to illuminate the diffuser,
wherein the different lighting patterns correspond to different NAILS.

5. The microscopy system of claim 4, wherein the different NAILS correspond to different types of DUTs.

6. The microscopy system of claim 5, wherein the different types of DUTs are different types of radiused end connectors.

7. A microscopy system for inspection of an end connector of a fiber optic cable, comprising:
a controller;
an imager operably connected to the controller to image an end connector;
a light source operably connected to the controller to provide illumination;
a diffuser to receive and diffuse the illumination from the light source, and to project the diffused illumination;
a beamsplitter to receive and reflect the diffused illumination;
an objective to receive and project the reflected diffused illumination upon the end connector, wherein either the diffuser or an image of the diffuser is disposed at the back focal plane of the objective; and
a storage to store machine-readable instructions that, when executed by the controller, cause the controller to:
control the light source to provide the illumination to the diffuser such that the reflected diffused illumination provides Köhler illumination to the end connector;
control the imager to perform imaging of the end connector by receiving reflected light from the Köhler illumination of the end connector; and
when the end connector is a radiused end connector, control the light source to provide the illumination to the diffuser such that a numerical aperture of illumination ($NA_{IL}$) of the radiused end connector is greater than a numerical aperture of imaging ($NA_{IM}$) of the radiused end connector.

8. The microscopy system of claim 7, wherein, when the end connector is a radiused end connector, the controller is further to control the light source to provide a lighting pattern to illuminate the diffuser, and
wherein the lighting patterns corresponds to a $NA_{IL}$ which corresponds to the radiused end connector.

9. The microscopy system of claim 8, wherein the storage is further to store different lighting patterns that correspond to different NAILS which correspond to different types of radiused end connectors.

10. The microscopy system of claim 8, wherein the light source comprises:
an array of light sources to illuminate the diffuser.

11. The microscopy system of claim 10, wherein the light pattern comprises:
a spatial pattern of the array of light sources, wherein the spatial pattern comprises a pattern of lit and unlit light sources in the array of light sources.

12. The microscopy system of claim 10, wherein the controller is further to control the array of light sources to provide the lighting pattern by controlling one or more light sources in the array of light sources to at least one of turn on, turn off, change intensity, change wavelength, or change polarity.

13. The microscopy system of claim 10, wherein the array of light sources comprises:
a circular array of light emitting diodes (LEDs).

14. The microscopy system of claim 7, wherein either the diffuser or an image of the diffuser is disposed at the back focal plane of the objective to provide Köhler illumination to the end connector.

15. A method for viewing, by a microscopy system, an end connector of a fiber optic cable, comprising:
(a) changing, by a controller, one or more parameters of an array of light sources, wherein the array of light sources provides illumination to a diffuser which projects diffused illumination to reflect off of a beamsplitter through an objective to illuminate an end connector;
(b) controlling, by the controller, an imager to capture an image corresponding to the changed one or more parameters;
(c) analyzing, by the controller, the captured image to determine if a condition for viewing is met;
(d) when the condition for viewing is not met, repeating steps (a), (b), and (c); and
(e) when the condition for viewing is met, maintaining a lighting pattern of the array of light sources with the one or more parameters which provided the illumination for the image which met the condition for viewing,
wherein the condition for viewing comprises at least one of (i) a threshold for one or more of imaging, inspection, or examination; (ii) a user-entered goal or parameter; or (iii) a timeout, wherein step (e) is performed after a specific number of iterations of step (d).

16. The method of claim 15, further comprising, after step (e):
providing, by the controller, feedback indicating the end connector may be viewed.

17. The method of claim 15, further comprising, before step (a):
receiving, by the controller, input indicating how the one or more parameters are to be changed in step (a).

18. The method of claim 15, wherein the controller automatically determines how the one or more parameters are to be changed in step (a).

19. The method of claim 15, further comprising, after step (e):
storing, by the controller, the lighting pattern which met the condition for viewing for the end connector in a storage.

20. The method of claim 15, further comprising, after step (e):
(f) controlling, by the controller, the imager to capture an image corresponding to the lighting pattern; and
(g) storing, by the controller, the captured image.

* * * * *